United States Patent [19]

Michaelis

[11] Patent Number: 5,412,008
[45] Date of Patent: May 2, 1995

[54] STABILIZED METHYLMETHACRYLATE POLYMERS

[75] Inventor: Peter Michaelis, Freiburg, Germany

[73] Assignee: Ciba-Geigy Corporation, Ardsley, N.Y.

[21] Appl. No.: 143,240

[22] Filed: Oct. 22, 1993

Related U.S. Application Data

[63] Continuation of Ser. No. 22,795, Feb. 23, 1993, abandoned, which is a continuation of Ser. No. 856,235, Mar. 25, 1992, abandoned.

[30] Foreign Application Priority Data

Mar. 27, 1991 [CH] Switzerland ............................ 938/91

[51] Int. Cl.$^6$ ........................................... C08K 5/3492
[52] U.S. Cl. ................................................... 524/100
[58] Field of Search ........................................... 524/100

[56] References Cited

U.S. PATENT DOCUMENTS

| | | | |
|---|---|---|---|
| 3,118,887 | 1/1964 | Hardy et al. | |
| 3,242,175 | 3/1966 | Duennenberger et al. | 524/100 |
| 3,244,708 | 4/1966 | Duennenberger et al. | 524/100 |
| 3,268,474 | 8/1966 | Hardy et al. | 524/100 |
| 3,284,394 | 11/1966 | Suen et al. | |
| 3,843,371 | 10/1974 | Piller et al. | |
| 4,619,956 | 10/1986 | Susi | 524/87 |
| 4,801,508 | 1/1989 | Lutz et al. | 524/100 |
| 4,962,142 | 10/1990 | Migdal et al. | 524/100 |
| 5,084,570 | 1/1992 | Burdeska et al. | 544/216 |

FOREIGN PATENT DOCUMENTS 484695 12/1963 Switzerland .

OTHER PUBLICATIONS

EPO Patent Search dated Jul. 14, 1993.
Heterocyclic Compounds, vol. 72, 1970, p. 365, 121590n Hydroxyphenyl-s-triazine protective materials against untraviolet rays for textiles, Max Duennenberger.
Chem. Absts, 72, 79103d (1970).
Chem. Absts 77, 10154w (1972).

*Primary Examiner*—Kriellion S. Morgan
*Attorney, Agent, or Firm*—Luther A. R. Hall

[57] ABSTRACT

Hydroxyphenyltriazines of formula I

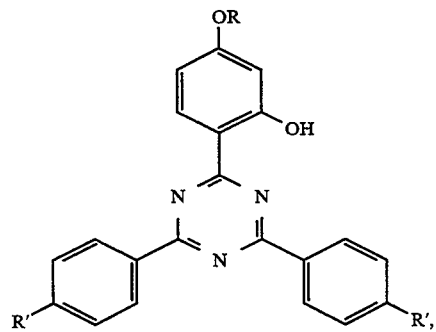

wherein
R is hydrogen, $C_1$–$C_{18}$alkyl, halogen- or $C_1$–$C_{12}$alkoxy-substituted $C_2$–$C_6$alkyl, or benzyl, and
R' is hydrogen or methyl, are particularly suitable stabilizers for polymethylmethacrylate and copolymers thereof.

10 Claims, No Drawings

STABILIZED METHYLMETHACRYLATE POLYMERS

This application is a continuation of application Ser. No. 08/022,795, now abandoned, filed Feb. 23, 1993, which is a continuation of application Ser. No. 07/856,235, filed Mar. 25, 1992, now abandoned.

The present invention relates to stabilised methylmethacrylate homo- and copolymers which contain a 2-hydroxyphenyl-s-triazine carrying specific substituents.

It is well known to protect polymers against degradation caused by light, oxygen and heat by incorporating therein a 2-hydroxy-s-triazine of formula

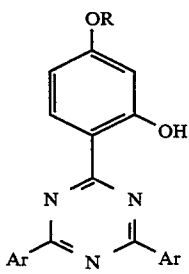

wherein R may be hydrogen or an organic radical, and Ar denotes aromatic radicals which do not carry hydroxyl groups (q.v. U.S. Pat. No. 3,244,708 and CH-B-480 091). Such compounds are sind UV absorbers and have also been proposed for stabilising photographic materials (U.S. Pat. No. 3,843,371) or polymer films and coatings (U.S. Pat. No. 4,619,956).

In the above cited publications, mainly those triazine derivatives have been used wherein Ar is a 2,4-dimethylphenyl radical, because these compounds are fairly readily obtainable. Recently, methods have been developed which also make it possible to synthesise those triazines which carry other aryl radicals (EP-A-395 938).

Surprisingly, it has now been found that those triazines in which Ar is a phenyl or p-tolyl radical have an especially effective stabilising action in methylmethacrylic homo- and copolymers which is markedly superior to that of triazines in which Ar is a 2,4-dimethylphenyl radical.

The invention therefore relates to a polymer composition which is stabilised against degradation caused by the action of light, oxygen and heat, said composition comprising a) a methylmethacrylate homopolymer or copolymer which contains at least 80% of methylmethacrylate in polymerised form, and b) as stabiliser, at least one hydroxyphenyltriazine of formula I

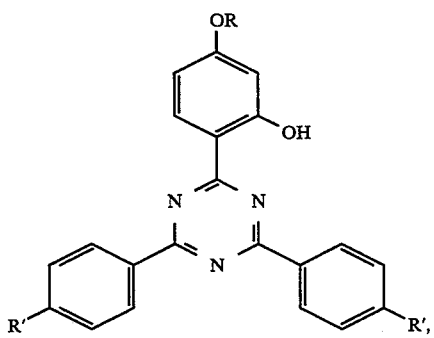

wherein
R is hydrogen, $C_1$–$C_{18}$alkyl, halogen- or $C_1$–$C_{12}$alkoxy-substituted $C_2$–$C_6$alkyl, or benzyl, and
R' is hydrogen or methyl.

The methylmethacrylate homopolymer or copolymer may be a mass polymer, a suspension polymer or another type of polymer. The copolymer may contain as comonomer typically an alkyl acrylate, acrylonitrile, styrene or α-methylstyrene. It may also be a graft copolymer. The methylmethacrylate homo- or copolymer may be in the form of a mixture (polyblend) with another polymer, as with an elastic polymer as an impact-modified polymethylmethacrylate. Component a) is preferably a methylmethacrylate homopolymer.

The compounds of formula I are UV absorbers, and they are very stable to light and temperature. They are also very resistant to migration and extraction in polymethacrylate.

In formula I, R as $C_1$–$C_{18}$alkyl may be linear or branched alkyl and is typically methyl, ethyl, propyl, isopropyl, butyl, isobutyl, pentyl, hexyl, 2-ethylbutyl, heptyl, octyl, 2-ethylhexyl, nonyl, decyl, dodecyl, tetradecyl or octadecyl. R as halogen- or $C_1$–$C_{12}$alkoxy-substituted $C_2$–$C_6$alkyl may be 2-chloroethyl, 2-fluorethyl, 2-methoxyethyl, 2-ethoxyethyl, 2-isopropoxyethyl, 2-methoxypropyl, 3-butoxypropyl, 2-butoxyethyl, 2-hexyloxyethyl, 2-octyloxyethyl or 2-dodecyloxyethyl.

Preferably R is $C_1$–$C_{12}$alkyl or benzyl. The preferred meaning of R' is hydrogen.

Those polymer compositions are particularly preferred in which component b) is a compound of formula I and R is $C_1$–$C_8$alkyl, and R' is hydrogen.

Representative examples of compounds of formula I are:

2,4-diphenyl-6-(2-hydroxy-4-methoxyphenyl)-1,3,5-triazine
2,4-diphenyl-6-(2-hydroxy-4-ethoxyphenyl)-1,3,5-triazine
2,4-diphenyl-6-(2-hydroxy-4-propoxyphenyl)-1,3,5-triazine
2,4-diphenyl-6-(2-hydroxy-4-butoxyphenyl)-1,3,5-triazine
2,4-diphenyl-6-(2-hydroxy-4-hexyloxyphenyl)-1,3,5-triazine
2,4-diphenyl-6-(2-hydroxy-4-octyloxyphenyl)-1,3,5-triazine
2,4-diphenyl-6-(2-hydroxy-4-dodecyloxyphenyl)-1,3,5-triazine
2,4-diphenyl-6-(2-hydroxy-4-benzyloxyphenyl)-1,3,5-triazine
2,4-diphenyl-6-(2-hydroxy-4-(2-butoxyethoxy)phenyl)-1,3,5-triazine 2,4-di-p-tolyl-6-(2-hydroxy-4-methoxyphenyl)-1,3,5-triazine 2,4-di-p-tolyl-6-(2-hydroxy-4-propoxyphenyl)-1,3,5-triazine 2,4-di-p-tolyl-6-(2-hydroxy-4-butoxyphenyl)-1,3,5-triazine 2,4-di-p-tolyl-6-(2-hydroxy-4-hexyloxyphenyl)-1,3,5-triazine 2,4-di-p-tolyl-6-(2-hydroxy-4-pentoxyphenyl)-1,3,5-triazine 2,4-di-p-tolyl-6-(2-hydroxy-4-octyloxyphenyl)-1,3,5-triazine 2,4-di-p-tolyl-6-(2-hydroxy-4-benzyloxyphenyl)-1,3,5-triazine 2,4-di-p-tolyl-6-(2-hydroxy-4-(2-hexyloxyethoxy)-phenyl)-1,3,5-triazine The compounds of formula I are known compounds or they can be prepared by methods analogous to those for obtaining known ones. In principle they are prepared by etherifying corresponding 2,4-diaryl-6-(2,4-dihydroxyphenyl)-1,3,5-triazines. The etherification is carded out selectively in the 4-position, because the OH group in 2-position is sterically hindered by hydrogen bonding. The preparation of the 2,4-dihydroxyphenyl-triazines and their etherification is described, inter alia, in Helv. Chim. Acta 55 (1972), 1566-91; EP-A-395 938; U.S. Pat. Nos. 3,118,887; 3,242,175 or 3,244,708.

The amount of stabiliser incorporated will depend on the envisaged end use of the stabilised polymer. Normally the novel polymer composition will contain 0.1 to 5 parts by weight of stabiliser (component b).

The stabiliser (component b) may also be a mixture of two or more compounds of formula I. In addition to the stabiliser of formula I, the polymer composition may also contain other known stabilisers, typically antioxidants, light stabilisers, metal deactivators or phosphites. Representative examples of such co-stabilisers are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-di-octadecyl-4-methylphenol, 2,4,6-tri-cyclohexylphenol, 2,6-di-tert-butyl-4-methoxymethylphenol, 2,6-di-nonyl-4-methylphenol, 2,4-dimethyl-6-(1'-methyl-undec-1'-yl)phenol, 2,4-dimethyl-6-(1'-methyl-heptadec-1'-yl)phenol, 2,4-dimethyl-6-(1'-methyl-tridec-1'-yl)phenol and mixtures thereof.

1.2. Alkylthiomethylphenols, for example 2,4-dioctylthiomethyl-6-tert-butylphenol, 2,4-di-octylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-Di-tert-butyl-4-methoxyphenol, 2,5-di-tert-butyl-hydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxyphenyl)adipate.

1.4. Hydroxylated thiodiphenylethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.5. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl) dicyclopentadiene, bis[2-(3'-tert-butyl-2'-hydroxy-5'-methylbenzyl)-6-tertbutyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.6. O-, N- and S-benzyl compounds, for example 3,5,3',5'-tetra(tert-butyl-4,4'-dihydroxydibenzyl)ether, octadecyl-4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.7. Hydroxybenzylated malonates, for example dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis-(3,5-di-tert-butyl-4-hydroxybenzyl)malonate.

1.8. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazines, for example 2,4-bis[(octylmercapto-6-(3,5-di-tert-butyl-4-hydroxyanilino)]-1,3,5-triazine, 2-ocylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.10. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of monoethyl 3,5-di-tert-butyl-4-hydroxybenzylphosphonate.

1.11. Acylaminophenols, for example 4-hydroxylauryl anilide, 4-hydroxystearyl anilide, octyl N-(3,5-di-tertbutyl-4-hydroxyphenyl)carbamate.

1.12. Esters of β-(3,5-di-tertbutyl-4-hydroxyphenyl)-propionic acid with monohydric or polyhydric alcohols, as with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxalyl diamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.13. Esters of β-(5-tert-butyl-4-hydroxy-3-methylphenyl)propionic acid with monohydric or polyhydric alcohols, as with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxalyl diamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.14. Esters of β-(3,5-dicyclohexyl-4-hydroxyphenyl)propionic acid with monohydric or polyhydric alcohols, as with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalyl diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenylacetic acid with monohydric or polyhydric alcohols, as with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis-(hydroxyethyl)oxalyl diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

2. UV Absorbers and light stabilisers 2.1. 2-(2-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octyloxy, 3',5'-di-tert-amyl or 3',5'-bis-(α,α-dimethylbenzyl) derivative.

2.2. 2-Hydroxybenzophenone, for example the 4-hydroxy, 4-methoxy, 4-octoxy, 4-decyloxy, 4-dodecyloxy, 4-benzyloxy, 4,2',4'-trihydroxy, 2'-hydroxy-4,4'-dimethoxy derivative.

2.3. Esters of unsubstituted or substituted benzoic acids, for example 4-tertbutylphenyl salicylate, phenyl salicylate, octylphenyl salicylate, dibenzoyl resorcinol, bis(4-tert-butylbenzoyl) resorcinol, benzoyl resorcinol, the 2,4-di-tertbutylphenyl ester of 3,5-di-tert-butyl-4-hydroxybenzoic acid, hexadecyl 3,5-di-tert-butyl-4-hydroxybenzoate.

2.4. Acrylates, for example ethyl α-cyano-β,β-diphenylacrylate, isooctyl α,-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline. 2.5. Nickel compounds, for example nickel complexes of 2,2'-thiobis[4-(1,1,3,3-tetramethylbutyl)phenol], such as the 1:1- or 1:2 complex, with or without additional ligands, as n-butylamine, triethanolamine or N-cyclohexyl-diethanolamine, nickel dibutyl dithiocarbamate, nickel salts of monoalkyl esters of 4-hydroxy-3,5-di-tert-butylbenzylphosphonic acid, as of methyl or ethyl esters, nickel complexes of ketoximes, as of 2-hydroxy-4-methylphenyl undecyl ketoxime, nickel complexes of 1-phenyl-4-lauroyl-5-hydroxypyrazole, with or without additional ligands.

2.6. Sterically hindered amines, for example bis(2,2,6,6-tetramethylpiperidyl)sebacate, bis(2,2,6,6-tetramethylpiperidyl)succinate, bis(1,2,2,6,6-pentamethylpiperidyl)sebacate, the bis(1,2,2,6,6-pentamethylpiperidyl) ester of n-butyl-3,5-di-tert-butyl-4-hydroxybenzylmalonic acid, the condensate of 1-hydroxyethyl-2,2,6,6-tetramethyl-4-hydroxypiperidine and succinic acid, the condensate of N,N'-bis(2,2,6,6-tetramethyl-4-piperidyl)-hexamethylenediamine and 4-tertoctylamino-2,6-dichloro-1,3,5-s-triazine, tris(2,2,6,6-tetramethyl-4-piperidyl)-nitrilotriacetate, tetrakis(2,2,6,6-tetramethyl-4-piperidyl)-,1,2,3,4-butanetetraoate, 1,1'-(1,2-ethanediyl)-bis(3,3,5,5-tetramethylpiperazinone).

2.7. Oxamides, for example 4,4'-dioctyloxyoxanilide, 2,2'-dioctyloxy-5,5'-di-tertbutoxanilide, 2,2'-didodecyloxy-5,5'-di-tert-butoxanilide, 2-ethoxy-2'-ethoxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and paramethoxy-disubstituted oxanilides and mixtures of o- and p-ethoxy-disubstituted oxanilides.

2.8. Further 2-(2-hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxy-propoxy)phenyl]-4,6-bis(2,4-dimethylphenyl)-1,3,5-triazine, 2-[2-hydroxy-4-(2-hydroxy-3-octyloxy-propoxy)phenyl]-4,6-bis(2,4-dimethylphenyl)-1,3,5-triazine.

3. Metal deactivators, for example N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, 3,9-bis(2,4-ditert-butylphenoxy)-2,4,8,10-tetraoxa-3,9-diphosphas-piro[5.5]undecane.

The combination of the triazines of formula I with sterically hindered amines is of particular interest. Included are those compounds which contain at least one group of formula

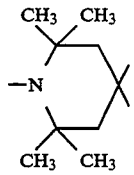

Examples of such stabilisers are listed above in item 2.6. Also of special interest is the combination of triazines of formula I with phenolic antioxidants.

In addition to such co-stabilisers, the polymer compositions may also contain other modifiers, typically lubricants, pigments, dyes, fluorescent whitening agents, flame retardants, antistatic agents or blowing agents.

The addition of the stabiliser and other optional modifiers to the polymer may be made before processing to shaped articles, typically by blending the components in powder form or by addition of the stabiliser to the melt or solution of the polymer. If shaping is effected during polymerisation (as in the fabrication of acrylic glass plates), then the stabilisers are added to the monomer.

The invention accordingly also relates to a process for stabilising methylmethacrylate homopolymers or copolymers which contain more than 80% of methylmethacrylate against degradation caused by the action of light, oxygen and heat, by addition of a stabiliser before or after polymerisation, which process comprises using at least one compound of formula I as stabiliser.

The stabilised polymers can be used in different form, typically in the form of panels, profiles, films, pipes or other moulded articles.

The stabilised polymers have superior weather resistance, especially superior resistance to UV light. In outdoor use they therefore also keep their mechanical properties as well as their transparency and gloss for an extended period of time.

The invention is illustrated in more detail by the following non-limitative Examples in which parts and percentages are by weight.

EXAMPLE 1

Resistance of the stabilisers to UV light 15 g of polymethylmethacrylate (Plex ® 8704, Röhm & Haas A. G.) and 60 mg of a stabiliser listed in Table 1 (equivalent to 0.4% of stabiliser) are dissolved at room temperature in 85 g of methylene chloride. Films from this solution are then drawn on glass plates. After evaporation of the solvent and drying under vacuum, the films have a thickness of 30 μm.

The films are stripped from the glass plates and stretched on cardboard frames (6×3 cm). These samples are irradiated for 3 months in a UV exposure apparatus with 5 TL/109 fluorescent lamps and 5 TU/12 lamps which are mounted 20 cm above the samples. The UV absorption is measured at regular intervals at the wavelength of maximum extinction.

The following stabilisers are used:

UV-1  2,4-diphenyl-6-(2-hydroxy-4-methoxy)-1,3,5-triazine
HALS 1: bis(1,2,2,6,6-pentamethyl-4-piperidyl)sebacate
V-1: 2,4-bis(2,4-dimethylphenyl)-6-(2-hydroxy-4-octyloxy)-1,3,5-triazine (comparison compound)

TABLE 1

| Stabiliser | Percentage UV absorption after the indicated irradiation time Weeks of UV irradiation | | | | | | |
|---|---|---|---|---|---|---|---|
| | 1 | 3 | 5 | 7 | 9 | 11 | 13 |
| 0.4% UV-1 | 102 | 100 | 96.6 | 94.2 | 88.9 | 84.9 | 79.8 |
| 0.2% UV-1 + 0.2% HALS-1 | 103 | 102 | 100 | 99.9 | 98.2 | 97.8 | 95.9 |
| 0.4% V-1 | 101 | 90.9 | 75.9 | 64.6 | 52.7 | 43.5 | 32.7 |

What is claimed is:

1. A polymer composition which is stabilised against degradation caused by the action of light, oxygen and heat, said composition comprising
   a) a methylmethacrylate homopolymer or copolymer which contains from 80 to 100% of methylmethacrylate in polymerised form, and
   b) an effective stabilising amount of a hydroxyphenyltriazine of formula I

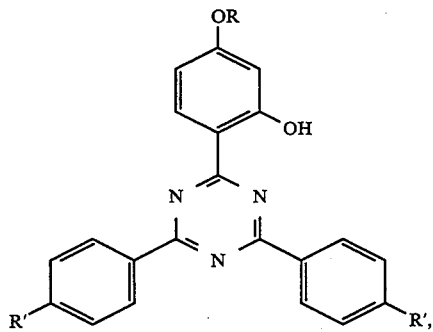

wherein
R is hydrogen, $C_1-C_{18}$alkyl, halogen- or $C_1-C_{12}$alkoxy-substituted $C_2-C_6$alkyl, or benzyl, and
R' is hydrogen or methyl.

2. A polymer composition according to claim 1, wherein component a) is a methylmethacrylate homopolymer.

3. A polymer composition according to claim 1, wherein component b) is a compound of formula I, wherein R is $C_1-C_{12}$alkyl or benzyl.

4. A polymer composition according to claim 1, wherein component b) is a compound of formula I, wherein R is $C_1-C_8$alkyl and R' is hydrogen.

5. A polymer composition according to claim 1, which contains 0.1 to 5 parts by weight of the stabiliser of component b) per 100 parts of the polymer of component a).

6. A polymer composition according to claim 1, comprising an other stabiliser or other modifier in addition to components a) and b).

7. A polymer composition according to claim 6, comprising a light stabiliser of the class of the sterically hindered amines in addition to components a) and b).

8. A process for stabilising methylmethacrylate homopolymers or copolymers which contain from 80 to 100% by weight of methylmethacrylate against degradation caused by the action of light, oxygen and heat, which process comprises adding before or after polymerisation an effective stabilising amount of a compound of formula I as defined as component b) in claim 1.

9. A shaped article comprising a polymer composition as defined in claim 1.

10. A shaped article according to claim 9 in the form of a panel or a film.

* * * * *